June 27, 1939. H. J. BAYER 2,164,226
OVEN
Filed April 27, 1938
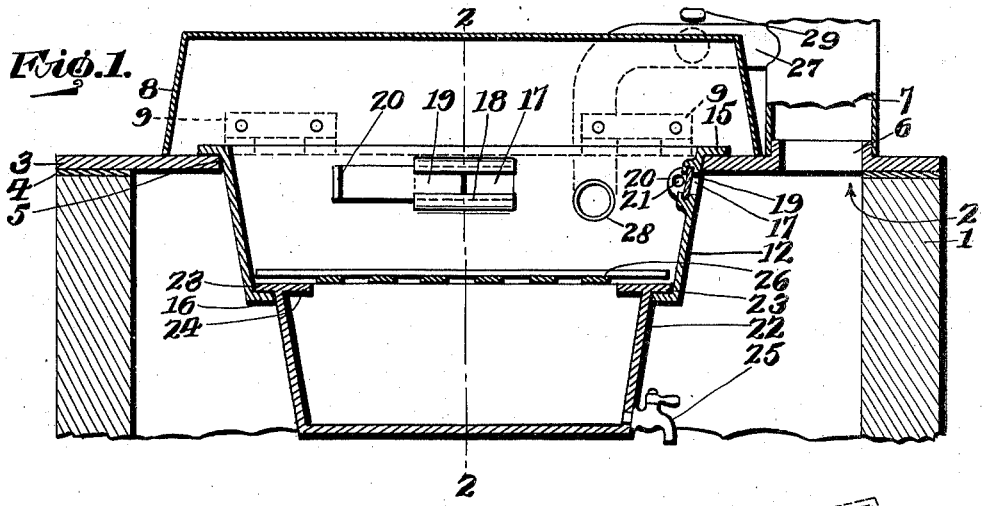
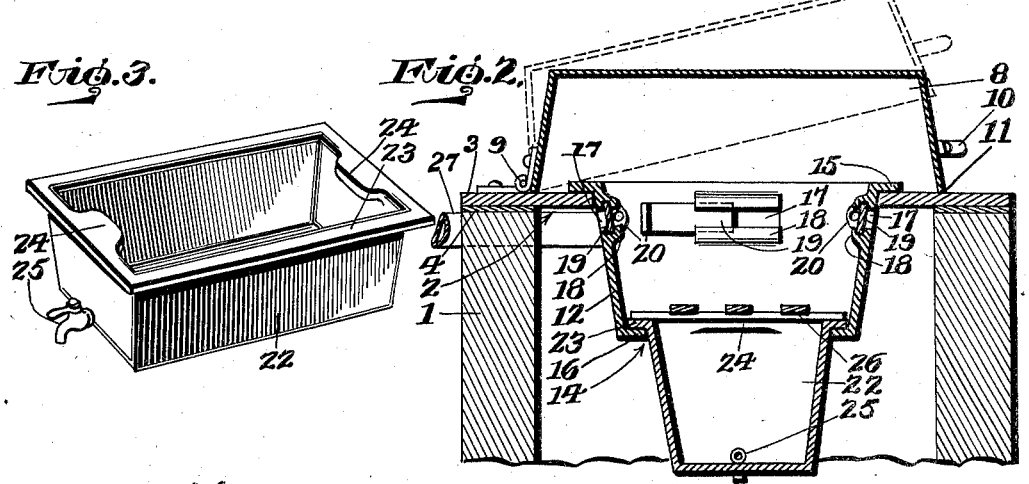
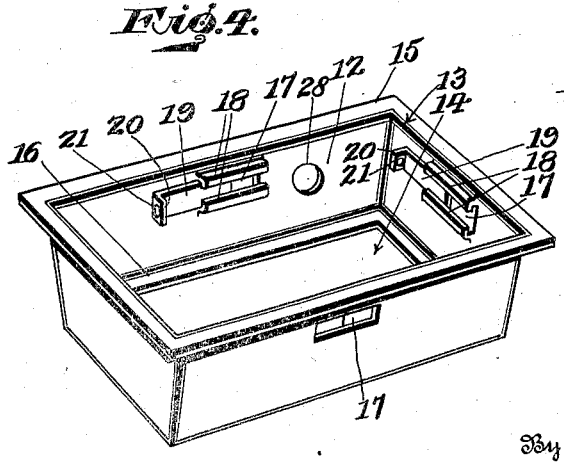
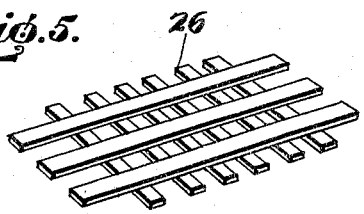
Inventor
H. J. Bayer
By Munn, Anderson & Liddy
Attorney Patented June 27, 1939

2,164,226

UNITED STATES PATENT OFFICE 2,164,226

OVEN

Henry J. Bayer, Mount Vernon, Ill.

Application April 27, 1938, Serial No. 204,674

6 Claims. (Cl. 126—273)

This invention relates to improvements in ovens, particularly of the barbecue type. While it is contemplated to operate this oven out in the open, yet it is not confined to that use as will be later apparent.

Barbecue ovens often have the fault of cooking the meat into a hard crust because of its direct contact to the heat and smoke of a fire, this crust retarding, if not preventing, the cooking of the meat down to the bone. According to the improved oven the meat is brought as near into contact with the fire as is possible without establishing a direct contact, one of the resulting effects being to avoid the baking on of a crust and, further, to avoid any possibility of the meat not being cooked to the bone.

With this preamble in mind, the objects of the invention are as follows:

First, to provide an oven, intended mainly, but not exclusively, for outdoor and semi-outdoor use on the principle of a barbecue oven, and although the meat is shielded from the flames, yet being closer thereto than is the case in ordinary ovens, it is capable of being seasoned by smoking to an accurately regulated degree.

Second, to provide an oven wherein the meat is suspended or supported in an atmosphere of sauce vapor, the advantages of which lies in the surrounding of the meat with a sauce vapor of uniform density, insuring the even penetration of the meat to the bone, and eliminating the current need for basting.

Third, to insure a moist, fresh and tender meat when the cooking is finished, because of suspension of the meat in a seasoned, hot vaporous atmosphere.

Fourth, to provide a telescopic oven wherein the nested parts are readily separated for cleaning, and as readily reassembled.

Fifth, to provide an oven as described with tightly jointed parts which, although in mere contact, are entirely effective in excluding dirt and unwanted smoke.

Sixth, to provide an oven which does not have to be opened until the end of the cooking period, thereby avoiding the waste of vapors and the seasoning which it represents.

Seventh, to provide an oven wherein one or more adjustable slides or dampers are used solely for the regulation of the admission of smoke to the vaporous atmosphere.

Other objects and advantages will appear in the following specification, reference being had to the accompanying drawing in which:

Figure 1 is a vertical longitudinal section of the improved oven,

Figure 2 is a cross section taken on the line 2—2 of Fig. 1,

Figure 3 is a perspective view of the sauce pan, 5

Figure 4 is a perspective view of the meat oven, and

Figure 5 is a perspective view of the grate.

In carrying out the invention provision is made of a firebox 1 which may comprise any desired kind of structure within which a fire can be built. The invention is not concerned with the nature of grate which this firebox will contain, consequently no showing thereof is made.

Ordinarily the firebox 1 will be built up of bricks. The top is left open at 2. A cast iron plate 3, herein conveniently termed the fire plate, is fitted on top of the walls of the firebox 1, being cemented in place at 4 or secured in some other desired firm manner.

This fire plate has an opening 5 and a flue collar 6, both communicating with the fire chamber inside of the box 1. A flue 7 is fitted on the collar 6 to carry off the smoke.

A cover 8 is hinged to the fire plate 3 at 9 (Fig. 2). The hinging occurs on one of the longitudinal sides of the cover, the opposite side having a handle 10 (Fig. 2) but which cover is conveniently raised and let down (dotted and full lines).

It is an important consideration that the marginal edge 11 of the cover 8 shall make a smoke and vapor-proof joint with the fire plate 3. This joint can be adjusted by a careful forming of the marginal edge. The top of the plate 3 is also necessarily level so that there will be no space between the plate and the marginal edge to let the internal vapor out.

A meat oven 12 is inserted in the opening 5. This oven is open at the top and bottom, the openings being generally designated 13, 14 (Fig. 4). The top opening has an external marginal flange 15 which engages the plate 3 around its opening 5 and supports the meat oven 12 in the suspended position. It is necessary for the flange 15 to make a smoke and vapor proof joint with the plate 3. Toward that end the surfaces are dressed carefully so that there will not be any space.

The bottom opening of the meat oven 12 is bounded by an internal flange 16. Thus the oven 12 has flanges at the top and bottom, the one being externally located, the other internally. At least one of the upright walls of the oven 12 has a smoke opening 17. Guides 18 are provided along the top and bottom margins of said opening. A slide 19 is fitted in said guides to regulate the ingress of smoke. A protuberance 20 on one end of the slide has a hole 21 into which a suitable implement is adapted to be fitted to adjust the slide while the oven 12 is hot.

In practice the damper which the opening 17 and slide 19 comprise will be duplicated on more than one of the upright walls. The present illustration is that of three dampers (Fig. 4) on as many upright walls. The number of dampers to be employed is a matter of selection, but it is preferred to use more than one damper and not to have the smoke opening 17 too large in any one of them, thereby securing a better regulation of the smoke.

A sauce pan 22 is fitted inside of the meat oven 12 and extended below the bottom thereof (Fig. 1). The sauce pan has an external marginal flange 23 which rests upon the oven flange 16. Again, it is necessary to have a smoke and vapor-proof joint where the two flanges meet, so that neither smoke may enter here from the outside nor vapor escape from the inside. The sauce pan 22 has handholds 24 (Fig. 3). These are directed inwardly of the pan, and they lie in the same plane as the flange 23. The inward extension of the handholds provides a better support for the grate than if the latter were simply laid upon the flange 23. A petcock 25 provides for the draining of the sauce pan.

The previously mentioned grate, now designated 26 (Fig. 5) comprises any desired form of grill upon which the meat can be laid. According to the present showing the grate simply consists of crossed bars which are permanently connected by spot welding. It is perfectly obvious that the grate might also comprise a single casting but the specific construction of the grate has nothing to do with the invention. As plainly shown in Fig. 1 the grate occupies a position in the approximate center of the oven so that the meat supported thereby is held in the approximate middle of an enveloping, vaporous atmosphere.

From the foregoing description it will be seen that the oven comprises a telescopic construction in part. The fire plate 3, meat oven 12 and sauce pan 22 are interfitted so that the various elements are supported from each other. Of course, the fire plate is the final support inasmuch as it is carried by the oven foundation 1.

In the use of the oven the pan 22 is supplied with a desired quantity of sauce of any preferred nature. After the emplacement of the grate 26 the meat is laid in the oven and the cover 8 is closed. The fire in the firebox 1 is mainly directed to the bottom of the sauce pan, although both the oven 12 and the sauce pan 22 will be subjected to the heat.

Smoke will escape only through the flue 7, unless one or more of the dampers 17, 19 is opened to permit the ingress of smoke to the oven where it will commingle with the vaporous atmosphere emanating from the liquid sauce. As previously indicated, by suspending the meat in a hot, spiced vaporous atmosphere there will be an absolutely uniform cooking of the meat and an even penetration thereof by the spices so that the product is far superior to any that could be gotten from known ovens of similar types.

The suspension of the meat in the foregoing vaporous atmosphere avoids the necessity of periodic basting. The cover 8 will be kept closed from the beginning to the end of the cooking process. This avoids the loss of both heat and spices. A further and incidental advantage to this feature is that only enough fire is required to center upon the bottom of the sauce pan 22, this being an item of economy inasmuch as hickory and sassafras woods are customarily used in barbecue cooking.

In order that the smoke content of the oven may be controlled by means other than the regulation afforded by the dampers 17, 19, provision is made of a pipe 27 which is connected between the flue 7 and the interior of the oven. This pipe may be of any convenient nature, either a rigid two inch pipe such as is commonly used as down-spouting, or it may be of the flexible variety. For convenience and illustration the low end of this pipe is shown as merely fitted in a hole 28 in the meat oven 12. It is conceivable that this pipe might be connected to the cover 8, especially if the pipe is flexible, as suggested. Further, it is desirable to provide this pipe with a damper 29 so that the smoke exhausting operation will not be continuous. In other words, there may be times when an excess of smoke will make it necessary to clear the interior of the oven to some extent, but then it would be undesirable to keep on exhausting the vapor because to do so would mean a loss of both heat and spices.

While the dampers 17, 19 are specifically described as comprising a rectangular opening and slide, respectively, it is to be understood that the same benefits could be had by making these dampers of the round variety. The movable member of the latter would have a protuberance identical with 20 (Fig. 4) also with a hole for the insertion of a manipulating implement.

I claim:

1. An oven comprising a sectional enclosure consisting successively of a sauce pan to contain a liquid, a meat oven and a cover, means for suspending the enclosure over a fire, the heat converting the liquid into a vaporous atmosphere within the enclosure, means to support a piece of meat in the approximate center of said vaporous atmosphere, and means to admit regulated quantities of smoke from the fire into the enclosure to commingle with the vapor.

2. An oven comprising an enclosure consisting of progressively smaller sections, said sections being a telescopic meat oven and a sauce pan, a firebox, a fire plate on the box from which said sections are suspended, a cover seated upon the fire plate over the meat oven, flange connections joining the oven, pan and fire plate in smoke and vapor-tight engagement, means resting upon the flange connections to support a piece of meat in the approximate center of the vaporous atmosphere within the enclosure, and means to regulate the ingress of smoke from the firebox into the enclosure.

3. An oven comprising a firebox, a fire plate secured upon said box, having an opening and a flue collar, a cover hinged to the plate and being marginally fitted to make a tight joint with said plate when closed upon the opening, an open-bottomed meat oven inserted in the opening, being marginally flanged to engage the plate smoke-tight and to suspend the meat oven in the firebox, at least one damper in a side wall of the meat oven to control the ingress of smoke, a sauce pan inserted in the opening of the meat oven, being marginally flanged to engage said oven around its opening smoke-tight and to suspend said sauce pan from said oven, and a grate laid upon the marginal flange of the sauce pan.

4. In an oven, a meat oven having upright walls and a smoke opening in at least one upright wall, guides along the top and bottom margins of the smoke opening, and a slide fitted in the guides to regulate the ingress of smoke, said slide having a protuberance on one end with a hole permitting the insertion of a slide-moving implement when the oven is hot.

5. An oven comprising a fire box, a sectional enclosure located in the fire box, means surmounting the fire box and providing a support for said enclosure, a cover upon said means fitted over the enclosure, a smoke flue leading from the fire box to the outer atmosphere, at least one damper embodied in the sectional enclosure for admitting some of the smoke from the fire box to the interior of said enclosure, and a pipe connecting said enclosure to the smoke flue for leading off undesired amounts of smoke from the enclosure.

6. In an oven, a sauce-pan having an integral external marginal flange around its open end, one of the purposes of said flange being to support a grate, and hand-holds on said open end integral with said sauce-pan, being directed inwardly thereof and lying flush with the marginal flange to provide a better support for said grate.

HENRY J. BAYER.